United States Patent Office 3,538,110
Patented Nov. 3, 1970

3,538,110
PRODUCTION OF 4-METHYLOXAZOLE-5-
CARBOXYLIC ESTERS
Werner Reif and Horst Koenig, Ludwigshafen (Rhine), Germany, assignors to Badische Anilin- & Soda-Fabrik Aktiengesellschaft, Ludwigshafen (Rhine), Germany
No Drawing. Filed Oct. 24, 1967, Ser. No. 677,779
Claims priority, application Germany, Nov. 12, 1966, 1,670,165
Int. Cl. C07d 85/44
U.S. Cl. 260—307      4 Claims

ABSTRACT OF THE DISCLOSURE

Production of 4-methyloxazole-5-carboxylic esters by reacting α-chloracetoacetic esters with formamide. The products are intermediates, for example for the production of vitamin $B_6$.

---

It is known that 4,5-disubstituted oxazole derivatives can be prepared by reaction of α-haloketones with carboxylic amides or ammonium salts of carboxylic acids (G. Sa. Kondrateva, Khuan Chghi-Khén, Journal of General Chemistry of USSR, 32, 2348 et seq. (1962)). Products having an unsubstituted 2-position are obtained when formamide is used as the carboxylic amide (G. Theilig, Berichte, 86, 96 et seq. (1953)). The α-haloketones described in the said works are α-bromoketones of aliphatic or aromatic character.

It is also known that 4-methyloxazole-5-carboxylic esters can be obtained by reacting α-chloroacetoacetic esters with ammonium salts of carboxylic acids in the said acids as solvents (Cornforth, J. Chem. Soc., 93 et seq. (1953)). This method has some important disadvantages which considerably limit its industrial use. Thus for example working up the reaction mixture to isolate the oxazole derivative formed therefrom makes it necessary to neutralize the whole amount of acid. Moreover considerable corrosion problems are raised by the use of the acid as a solvent which places special requirements on the material used for equipment, pipelines, fittings and the like. Finally the product obtained contains impurities even after distillation. It is stated in the said publication that an oxazole derivative is not formed from α-chloroacetoacetic esters and acetamide. From this it must be concluded that in the reaction of α-halodicarbonyl compounds the ammonium salt of a carboxylic acid cannot be replaced by its amide and also that this cannot be an intermediate product of the reaction.

The object of the present invention is to provide a new process for the production of 4-methyloxazole-5-carboxylic esters in good yields and in a simple manner.

In accordance with this invention this and other objects are achieved by 4-methyloxazole-5-carboxylic esters are surprisingly obtained by reacting α-chloroacetoacetic esters with formamide. The formamide is advantageously used in excess, preferably in an amount of 2 to 10 moles to 1 mole of α-chloroacetoacetic ester.

The reaction is carried out at temperatures of 80° to 180° C., preferably from 120° to 150° C. The optimum reaction period depends on the temperature chosen and on the relative proportions of the reactants. In general a reaction period of two to twelve hours is adequate for complete reaction of the α-chloroacetoacetic ester.

The end product is obtained immediately in excellent purity after simple distillation, if necessary under subatmospheric pressure.

The formamide may be used in technical grade without appreciable diminution in yield. Not only ethyl α-chloroacetoacetate, but also the esters of other alcohols may be used, for example the methyl ester, propyl ester, amyl ester or isobutyl ester. The reactants may be mixed in any sequence. It is advantageous to stir the reaction mixture during the reaction in order to ensure uniform heating.

Working up may be carried out for example by adding the equivalent amount of a base to the reaction mixture and distilling the resulting mixture, or by adding an aqueous solution of a base, extracting with a solvent which is sparingly soluble in water and distilling the extract. The distilled product usually crystallizes immediately.

The process according to this invention represents an advance in the art in that the abovementioned disadvantages of prior art methods for the production of 4-methyloxazole-5-carboxylic esters are avoided. In particular the process is distinguished by the fact that the reaction mixture may be worked up very simply, preferably by neutralization of the equivalent of hydrochloric acid formed in the reaction followed by an ordinary distillation, at atmospheric or subatmospheric pressure.

It is known that 4-methyloxazole-5-carboxylic esters are valuable intermediates, for example for the production of vitamin $B_6$.

The invention is further illustrated by the following examples in which parts are by weight unless otherwise stated. Parts by weight bear the same relation to parts by volume as the gram to the cubic centimeter.

EXAMPLE 1

5 parts of ethyl α-chloroacetoacetate and 14 parts of foramide are stirred for two hours at a bath temperature of 150° C. The mixture becomes darker and a small amount of solid separates out. The whole is allowed to cool, an amount of sodium carbonate calculated on 1 equivalent of acid split off, diassolved in 50 parts by volume of water, is added and the whole is extracted with ether. After the solvent has been distilled off, 1.75 parts (40% of the theory) of colorless crystalline 4-methyloxazole-5-carboxylic ethyl ester is obtained at 100° to 104° C. and 21 mm. Its melting point is 38° C.

EXAMPLE 2

50 parts of ethyl α-chloroacetoacetate and 42 parts of formamide are stirred for twelve hours at 120° C. 300 parts by volume of 1 N aqueous potassium carbonate solution at 0° C. is added, the whole is extracted with benzene and the benzene solution is distilled. The yield is 21 parts (49% of the theory) of 4-methyloxazole-5-carboxylic ethyl ester (boiling point 110° to 103° C. at 21 mm.). It is pure by gas chromatography.

EXAMPLE 3

790 parts of ethyl α-chloroacetoacetate and 650 parts of technical grade formamide are heated at 145° C. for four hours. 3000 parts by volume of ice-cold potassium carbonate solution is added, the whole is extracted with methylene chloride and the dried extract is distilled. 321 parts of 4-methyloxazole-5-carboxylic ethyl ester (i.e. 43% of the theory) distills over at 21 mm. from 100° to 103° C.

EXAMPLE 4

5.78 parts of n-butyl α-chloroacetoacetate and 4.2 parts of formamide are heated for six hours at 150° C. The reaction mixture is cooled and an aqueous potassium carbonate solution is added, the whole is extracted with ether and the ether extract is distilled. 2.2 parts of 4-methyloxazole-5-carboxylic acid n-butyl ester (40% of the theory) having a boiling point of 130° C. at 20 mm. is obtained as a colorless oil.

We claim:
1. A process for the production of 4-methyloxazole-5-carboxylic acid esters comprising reacting an α-chloroacetoacetic acid ester with formamide.
2. A process as claimed in claim 1 wherein the reaction is carried out with foramide in an amount of 2 to 10 moles calculated on 1 mole of α-chloroacetoacetic ester.
3. A process as claimed in claim 1 wherein the reaction is carried out at a temperature of 80° to 180° C.
4. A process as claimed in claim 1 wherein the reaction is carried out at a temperature of 120° to 150° C.

References Cited

Cornforth et al., J. Chem. Soc. (London), pp. 93–98 (1953).

Elderfield, Heterocyclic Compounds, vol. 5, (New York, 1957), pp. 307–309 and 312–313.

ALTON D. ROLLINS, Primary Examiner

PO-1050
(5/69)

UNITED STATES PATENT OFFICE
CERTIFICATE OF CORRECTION

Patent No. 3,538,110                    Dated November 3, 1970

Inventor(s) Werner Reif et al

It is certified that error appears in the above-identified patent and that said Letters Patent are hereby corrected as shown below:

Column 2, line 37, "foramide" should read -- formamide --; line 41, "diassolved" should read -- dissolved --; line 54, "110°" should read -- 100° --.

Column 3, line 15, "foramide" should read -- formamide --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents